(12) United States Patent
Lee (10) Patent No.: US 11,950,148 B2
(45) Date of Patent: Apr. 2, 2024

(54) HANDOVER MANAGEMENT METHOD

(71) Applicant: SK TELECOM CO., LTD., Seoul (KR)

(72) Inventor: Dong Jin Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 505 days.

(21) Appl. No.: 17/276,378

(22) PCT Filed: Sep. 27, 2019

(86) PCT No.: PCT/KR2019/012549
§ 371 (c)(1),
(2) Date: Mar. 15, 2021

(87) PCT Pub. No.: WO2020/067746
PCT Pub. Date: Apr. 2, 2020

(65) Prior Publication Data
US 2022/0053391 A1 Feb. 17, 2022

(30) Foreign Application Priority Data
Sep. 27, 2018 (KR) .................. 10-2018-0115105

(51) Int. Cl.
*H04W 36/08* (2009.01)
*H04W 36/00* (2009.01)

(52) U.S. Cl.
CPC ....... *H04W 36/0072* (2013.01); *H04W 36/08* (2013.01)

(58) Field of Classification Search
CPC .................. H04W 36/0072; H04W 36/008

USPC ......................................................... 455/436
See application file for complete search history.

(56) References Cited

U.S. PATENT DOCUMENTS

| | | |
|---|---|---|
| 2010/0189074 A1 | 7/2010 | Liao |
| 2013/0229939 A1 | 9/2013 | Teyeb et al. |
| 2014/0086159 A1 | 3/2014 | Sajadieh et al. |

(Continued)

FOREIGN PATENT DOCUMENTS

| | | |
|---|---|---|
| KR | 10-2016-0092389 A | 8/2016 |
| KR | 10-1722764 B1 | 4/2017 |
| WO | WO 2018/127189 A1 | 7/2018 |

OTHER PUBLICATIONS

PCT International Search Report and Written Opinion, PCT Application No. PCT/KR2019/012549, dated Jan. 7, 2020, 8 pages (with English translation of PCT International Search Report).

(Continued)

*Primary Examiner* — Ted M Wang
(74) *Attorney, Agent, or Firm* — WTA Patents (57) ABSTRACT

In accordance with an aspect of the present disclosure, there is provided a handover management method performed by a session management function (SMF). The method comprises, receiving handover information related to a user equipment (UE) receiving a predetermined service by accessing a source radio access network (S-RAN), obtaining, after receiving the handover information, resource information on a resource used when the predetermined service is provided to the UE at the S-RAN, and transmitting, to a user plane function (UPF), a request that a resource corresponding to the obtained resource information is to be secured in a target radio access network (T-RAN).

16 Claims, 6 Drawing Sheets

(56) References Cited

U.S. PATENT DOCUMENTS

2018/0270778 A1* 9/2018 Bharatia ................ H04L 65/80
2019/0261187 A1* 8/2019 Chen .................... H04W 36/00

OTHER PUBLICATIONS

3GPP TR 23.725 v.1.0.0. $3^{rd}$ Generation Partnership Project; Technical Specification Group Services and System Aspects; Study on Enhancement of Ultra-Reliable Low-Latency Communication (URLLC) Support in the 5G Core Network (5gC) (Release 16), Sep. 8, 2018, 61 pages.
3GPP TS 23.502 v.15.3.0. $3^{rd}$ Generation Partnership Project; Technical Specification Group Services and System Aspects; Procedures for the 5G System; Stage 2 (Release 15), Sep. 17, 2018, 331 pages.
European Patent Office, Extended European Search Report, European Patent Application No. 19864980.8, dated Jun. 14, 2022, eight pages.

* cited by examiner

| MEASUREMENT TIME (HH:MM:SS) | THROUGHPUT | LATENCY |
|---|---|---|
| 18:01.59 | 153 Mbps | 2ms |
| 18:02.00 | 145 Mbps | 5ms |
| 18:02.01 | 144 Mbps | 1ms |
| 18:02.02 | 120 Mbps | 1ms |
| 18:02.03 | 121 Mbps | 1ms |

FIG.5

| IDENTIFIER | HANDOVER REQUEST TIME HH:MM:SS | ESTIMATED TIME for HANDOVER | T-RAN ID | RESOURCE TYPE |
|---|---|---|---|---|
| SLICE ID/ UE ID/IP | 18:02.00 | 1.5s | No. 2 | THROUGHPUT |

FIG.6

| UE ID | THROUGHPUT | LATENCY | URLLC SERVICE |
|---|---|---|---|
| 14 | 57 Mbps | 2ms | URLLC |
| 15 | 326 Mbps | 5ms | NON-URLLC |
| 16 | 477 Mbps | 1ms | URLLC |
| 17 | 11 Mbps | 3ms | NON-URLLC |

HANDOVER MANAGEMENT METHOD

CROSS-REFERENCE TO RELATED APPLICATION

This application claims priority to Korean Patent Application No. 10-2018-0115105, filed on Sep. 27, 2018. The entire contents of the application on which the priority is based are incorporated herein by reference.

TECHNICAL FIELD

The present disclosure relates to a handover management method.

BACKGROUND

In the LTE communication system, as a type of a communication service and requiring data rate, etc. are diversified, expansion of the LTE frequency and evolution to the 5G communication system are actively progressing.

The rapidly evolving 5G communication system not only accommodates as many user equipments as possible based on limited radio resources but also supports scenarios of enhanced mobile broadband (eMBB), massive machine type communications (mMTC), and ultra-reliable and low latency communications (URLLC).

In the 5G communication system, the network structure to support, from end to end, the user equipments, base stations (radio access networks), cores, and servers is defined, and a network structure that separates the Control Plane for the control signaling functions and the User Plane for the data transmission/reception functions is defined by separating the control signaling functions and data transmission/reception functions performed by a single node (e.g., S-GW, P-GW, etc.) in the existing LTE (4G) communication system.

In this case, various nodes are included in the Control Plane. For example, the Access and Mobility Management Function (AMF) that controls wireless access of the user equipment, the Policy Control Function (PCF) that manages/controls policies such as user equipment information and subscription service information for each user equipment, billing, and the like, the Session Management Function (SMF) that manages/controls a session for using data services for each user equipment, and the Network Exposure Function (NEF) that performs an information sharing function with an external network may be included in the Control Plane.

In addition, functions such as the User Plane Function (UPF) may be included in the User Plane.

SUMMARY

In the 5G communication system, handover may be performed for a user equipment. If an Ultra-Reliable and Low Latency Communication (URLLC) service is being provided to the user equipment at the time when the handover is to be performed, it is desirable for the user equipment to receive, after the handover, the URLLC service of the same quality as that provided before the handover. In other words, even if the handover is performed, the URLLC service may be provided to the user equipment without interruption, and there may be no delay in terms of performance or a rate when the URLLC service is provided.

Accordingly, the problem to be solved by the present disclosure is to provide, when the handover was performed for the user equipment in the 5G communication system, a technology that enables, even after the handover, the user equipment to receive the URLLC service of the same quality as that provided to the user equipment before the handover was performed.

However, the problem to be solved by the present disclosure is not limited to the above description, and another problem to be solved that is not mentioned may be clearly understood by those skilled in the art to which the present disclosure belongs from the following description.

In accordance with an aspect of the present disclosure, there is provided a handover management method performed by a session management function (SMF). The method comprises, receiving handover information related to a user equipment (UE) receiving a predetermined service by accessing a source radio access network (S-RAN), obtaining, after receiving the handover information, resource information on a resource used when the predetermined service is provided to the UE at the S-RAN, and transmitting, to a user plane function (UPF), a request that a resource corresponding to the obtained resource information is to be secured in a target radio access network (T-RAN).

In accordance with another aspect of the present disclosure, there is provided a non-transitory computer-readable storage medium including computer executable instructions, wherein the instructions, when executed by a processor, cause the processor to perform a handover management method. The method comprises, receiving handover information related to a user equipment (UE) receiving a predetermined service by accessing a source radio access network (S-RAN), obtaining, after receiving the handover information, resource information on a resource used when the predetermined service is provided to the UE at the S-RAN, and transmitting, to a user plane function (UPF), a request that a resource corresponding to the obtained resource information is to be secured in a target radio access network (T-RAN).

According to an embodiment, a resource in a source base station used to provide the URLLC service may be secured in a target base station at the time or before the time when the handover to the target base station is completed for a user equipment accessing the source base station and receiving the URLLC service. Accordingly, the URLLC service having the same quality as the URLLC service provided to the user equipment before the handover is performed may be provided even after the handover.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
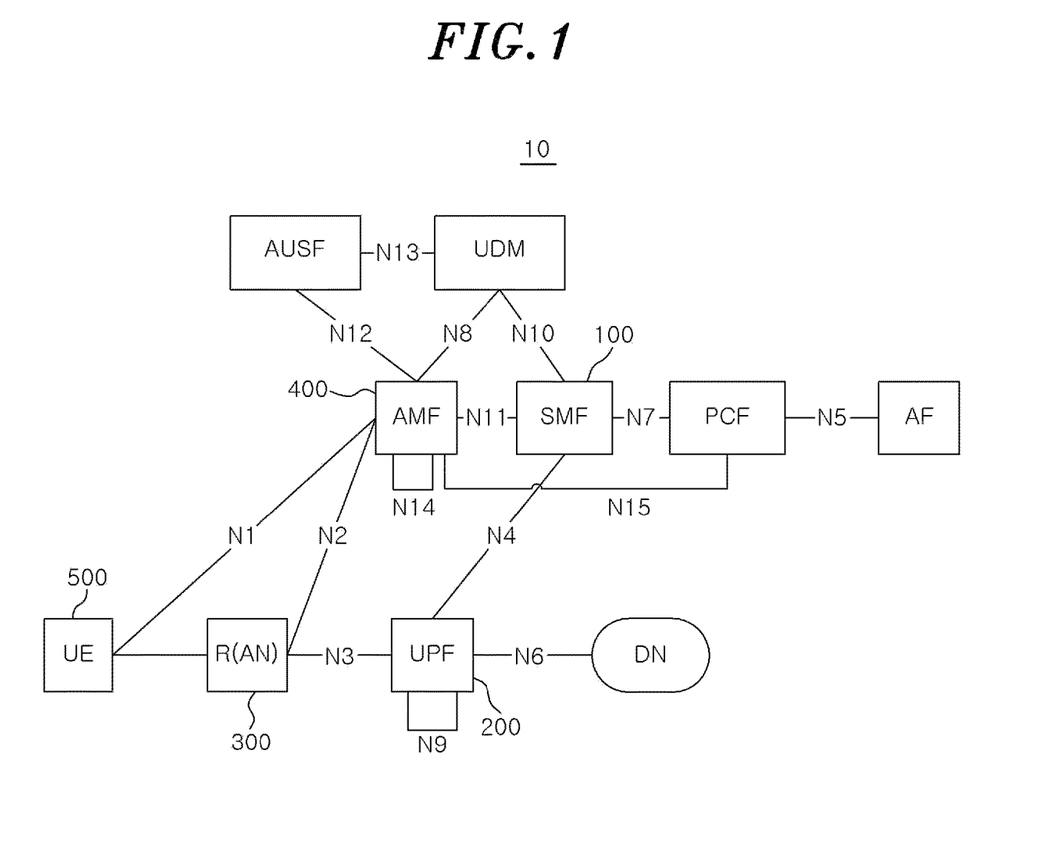
FIG. 1 shows a diagram conceptually illustrating an architecture of the 5G communication system according to an embodiment.

FIG. 1 shows a diagram conceptually illustrating an architecture 10 of the 5G communication system according to an embodiment.

The 5G communication system represented by the architecture 10 of FIG. 1 will be described. The 5G communication system is an advanced technology from a Long Term Evolution (LTE) communication technology that is the 4th generation communication system. The 5G communication system is an expanded technology of the LTE communication technology and a new Radio Access Technology (RAT) through an evolution of an existing mobile communication network structure or a clean-state structure, and supports extended LTE (eLTE), non-3GPP access, and the like.

However, because the architecture 10 illustrated in FIG. 1 is just an example, the idea of the present disclosure is not interpreted as being limited to the architecture 10 illustrated in FIG. 1 nor the 5G communication system.

The architecture 10 includes various components (for example, a network function (NF)). Hereinafter, these components will be described.

Referring to FIG. 1, an Authentication Server Function (AUSF), a Policy Control Function (PCF), an Application Function (AF), Unified Data Management (UDM), a Data Network (DN), a Session Management Function (SMF) 100, a User Plane Function (UPF) 200, an (Radio) Access Network ((R)AN) 300 or a base station 300, an (Core) Access and Mobility Management Function (AMF) 400, and a User Equipment (UE) 500 are shown.

Among these components, the UPF 200 may be a component included in the User Plane in the 5G communication system, and may be referred to as the User Plane Function device 200 or the UPF 200 in the detailed description. Hereinafter, it will be referred to as the UPF 200.

In addition, the SMF 100 may be a component included in a Control Plane separated from the above-described User Plane in the 5G communication system, and may be referred to as the Session Management Function device 100 or the SMF 100 in the detailed description. Hereinafter, it will be referred to as the SMF 100.

The SMF 100 and the UPF 200 each performs not only publicly known functions performed by the 5G communication system, but also functions intended to be provided in an embodiment. Accordingly, hereinafter, description of the publicly known technology performed by each of the SMF 100 and the UPF 200 will be briefly described or skipped, and the functions intended to be provided in an embodiment will be described in more detail.

Figure 2:
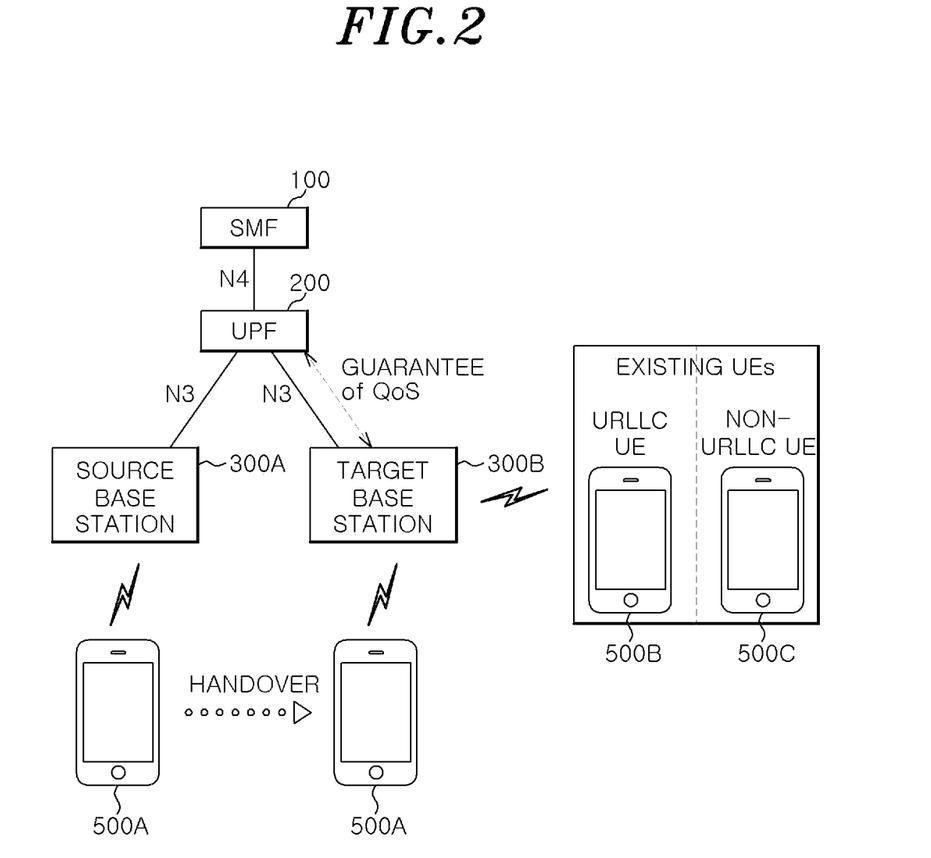
FIG. 2 shows a diagram illustrating a part of the architecture of the 5G communication system illustrated in FIG. 1.

FIG. 2 shows a diagram illustrating a part of the architecture 10 of the 5G communication system illustrated in FIG. 1. Referring to FIG. 2, the SMF 100, the UPF 200, a source RAN (S-RAN) 300A, a target RAN (T-RAN) 300B and existing UEs 500B and 500C that are already connected to the T-RAN 300B are shown. The SMF 100 and the UPF 200 are connected through an N4 interface, and the UPF 200 is connected to each of the S-RAN 300A and the T-RAN 300B through an N3 interface.

A UE 500A shown in FIG. 2 accesses the S-RAN 300A and is provided with a URLLC service while using a resource of the S-RAN 300A. While the UE 500A receiving the URLLC service, handover from the S-RAN 300A to the T-RAN 300B may be performed for the UE 500A. Even after the handover, the UE 500A may be provided with the URLLC service of the same quality as before the handover. In other words, even after handover, the URLLC service may be provided to the UE 500A without interruption, and there may be no delay in terms of performance or a rate when the URLLC service is provided.

To this end, the T-RAN 300B may secure, at the time or before the handover for the UE 500A to the T-RAN 300B is completed, the same amount of the resource as was used by the UE 500A when accessing the S-RAN 300A.

Accordingly, according to an embodiment, when the SMF 100 receives handover information related to the UE 500A from the AMF 400, the SMF 100 obtains resource information about the resource that the UE 500A used while accessing the S-RAN 300A. After obtaining the resource information, the SMF 100 transmits, to the UPF 200, a request that a resource corresponding to the resource information is secured or prepared in the T-RAN 300B at the time of before the handover for the UE 500A to the T-RAN 300B is completed. If it is difficult to secure a sufficient resource in the T-RAN 300B due to the existing UEs 500B and 500C already connected to the T-RAN 300B, the SMF 100 takes action to secure the resource in the T-RAN 300B by cooperating with the UPF 200. As an example of the action, an action to withdraw or reduce a part of a resource allocated to the existing UEs 500B and 500C that are already connected to the T-RAN 300B or an action to transmit a request for handover for a part of the existing UEs 500B and 500C to another RAN other than the T-RAN 300B may be included. As an additional action, for example, an action to transmit a request for limit on access of a new UE to the T-RAN 300B may be included.

In other words, according to an embodiment, when the handover to the T-RAN 300B is performed for the UE 500A accessing the S-RAN 300A and receiving the URLLC service, the resource in the S-RAN 300A used to provide the URLLC service may be secured in the T-RAN 300B at the time or before the handover for the UE 500A is completed. Accordingly, even immediately after the handover, the URLLC service may be seamlessly provided to the UE 500A, and a delay may not occur in terms of performance or a rate when the URLLC service is provided. In other words, a URLLC service of the same quality as the URLLC service provided to the UE 500A before the handover is performed may be provided to the UE 500A even after the handover. In addition, as the resource is secured in the T-RAN 300B, a resource for supporting the URLLC service may be provided for other interfaces connected to the UPF 200, such as an N6 interface or an N9 interface.

Hereinafter, with reference to FIG. 3, a procedure of a method of performing the above-described handover will be described in more detail.

Figure 3:
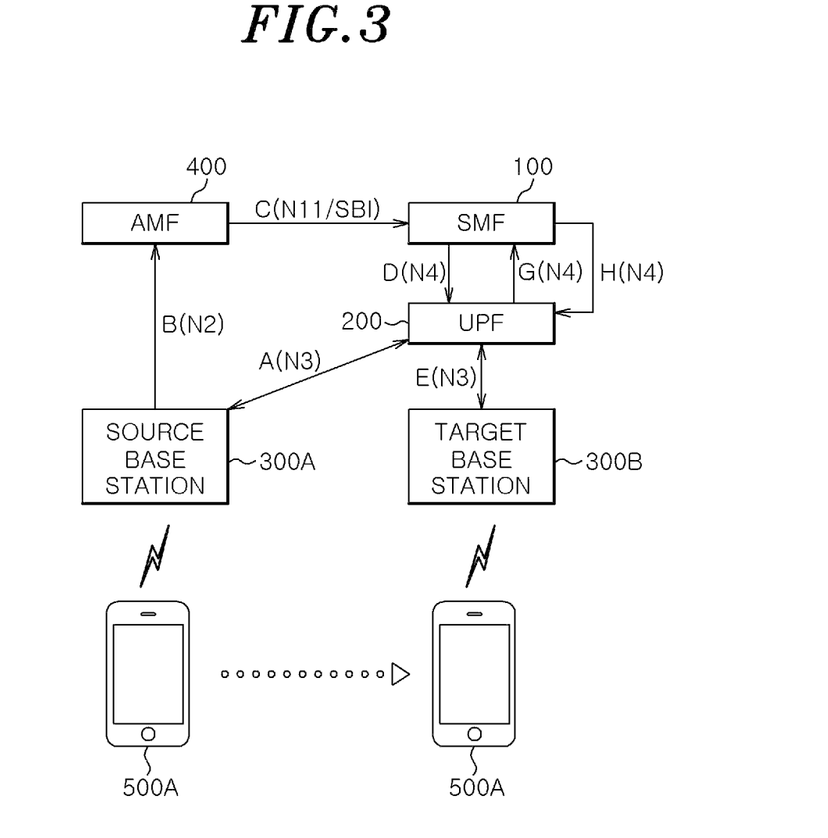
FIG. 3 shows a flowchart illustrating a handover management method according to an embodiment.

FIG. 3 shows a flowchart illustrating a handover management method according to an embodiment. This handover management method is performed by the SMF 100 shown in FIGS. 1 and 2. In addition, since what is shown in FIG. 3 is just an example, the idea of the present disclosure is not limited to that shown in FIG. 3.

Referring to FIG. 3, the SMF 100, the UPF 200, the S-RAN 300A, the T-RAN 300B, the AMF 400, and the UE 500A is shown.

The AMF 400 has information on a UE that has requested or is capable of receiving a URLLC service among a plurality of UEs connected to the S-RAN 300A, and provides this information to the S-RAN 300A. The S-RAN 300A provides the URLLC service to the UE 500A capable of receiving the URLLC service among the UEs accessing the S-RAN 300A based on this information received from the AMF 400.

At this time, a packet, which is a user plane packet, related to the URLLC service is transmitted and received between the UPF 200 and the S-RAN 300A through the N3 interface. Therefore, the packet is transmitted and received through the UPF 200. Accordingly, in a step A, the UPF 200 may obtain resource information about a resource of the S-RAN 300A used for transmitting and receiving the packet by monitoring the N3 interface.

Figure 4:
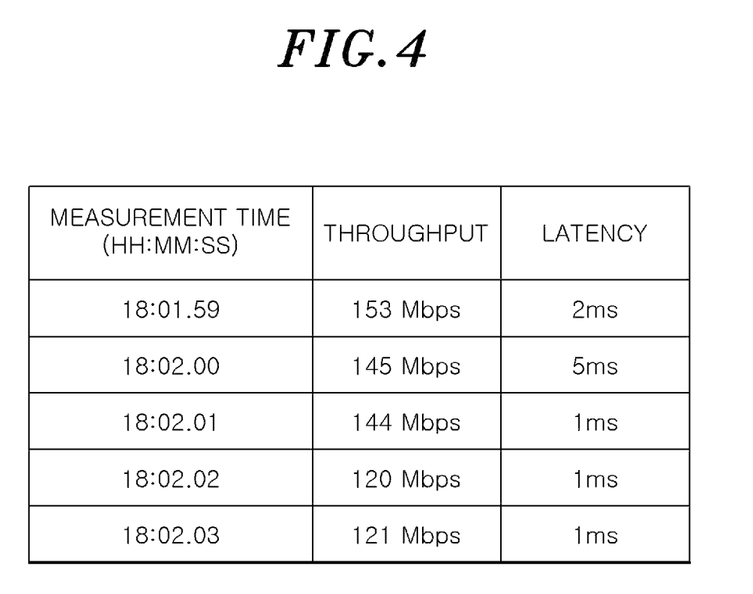
FIG. 4 shows a table illustrating resource information regarding a resource of a source base station that is measured at the source base station and used by a user equipment by accessing the source base station.

FIG. 4 shows a table illustrating the resource information related to the S-RAN 300A obtained by the UPF 200. Referring to FIG. 4, the time when the resource information is measured at the S-RAN 300A and the resource information measured at the time are shown. Herein, throughput and latency are shown as measurement targets in FIG. 4, but in addition, a bandwidth may also be measured and provided to the UPF 200 from the S-RAN 300A.

Referring back to FIG. 3, the S-RAN 300A monitors connection with the UE 500A and determines whether to perform handover for the UE 500A. If it is determined to perform the handover, in a step B, the S-RAN 300A transmits a handover support request to AMF 400 through an N2 interface. The step B may be performed in any one of a case in which the UE 500A prepares the handover, a case in which the handover is being executed, and a case where the handover is completed. In addition, various information may be transmitted from the S-RAN 300A to the AMF 400 together with the handover support request, which is illustrated in FIG. 5.

Figure 5:
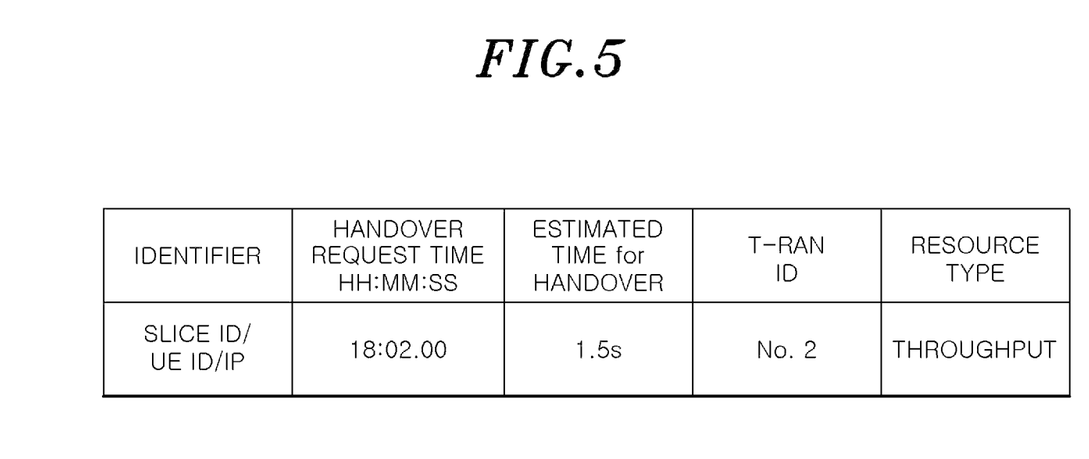
FIG. 5 shows a table illustrating information included in a handover support request that a source base station transmits to an AMF.

Referring to FIG. 5, at least one of an ID (or a slice ID) of the UE 500A for which the handover is to be performed, a session ID of the UE 500A, an IP address of the UE 500A, an ID of the T-RAN 300B, and time (or handover request time) when the handover support request is generated or made by the S-RAN 300A, estimated time for the handover, and types of the resource to be secured in the T-RAN 300B may be transmitted to the AMF 400 together with the handover support request, but is not limited thereto. In addition, although throughput is shown as the type of the resource to be secured in FIG. 5, latency or a bandwidth may be further included in the type of the resource to be secured.

Referring back to FIG. 3, in a step C, the AMF 400 transmits handover information related to the UE 500A to the SMF 100 through an N11 interface or a service based interface (SBI).

The above-described handover information may include at least one of the above-described various information transmitted from the S-RAN 300A to the AMF 400 in the step B and information on whether a handover request is urgent. If the handover request is urgent, the SMF 100 may process the handover request urgently or in preference to other handover requests, and may take action for a resource to be preferentially secured in the T-RAN 300B prior to other handover requests.

Thereafter, the SMF 100 obtains, from the UPF 200, the resource information of the S-RAN 300A used by the UE 500A while receiving the URLLC service. The resource information obtained by the SMF 100 from the UPF 200 may be the same as described in FIG. 4.

In addition, the SMF 100 transmits, to the UPF 200, a request that a resource corresponding the resource information of the S-RAN 300A used by the UE 500A is to be secured in the T-RAN 300B, and the UPF 200 takes an action in response to the request to make the resource to be secured in the T-RAN 300B. Herein, there are two methods to perform the above process.

The first method is that when the SMF 100 determines overall situations related to securing the resource and determines an appropriate action, the UPF 200 just receives the action from the SMF 100 and executes the received action. In other words, in this case, the SMF 100 makes determination, whereas the UPF 200 does not make any determination but serves as a performer.

On the other hand, the second method is that the SMF 100 simply transmits, to the UPF 200, a request for securing the resource, and then the UPF 200 makes determination according to the request and determines an appropriate action to execute. In other words, in this case, the SMF 100 does not make any determination, but just transmits the request, whereas the UPF 200 makes determination and serves as the performer.

Figure 6:
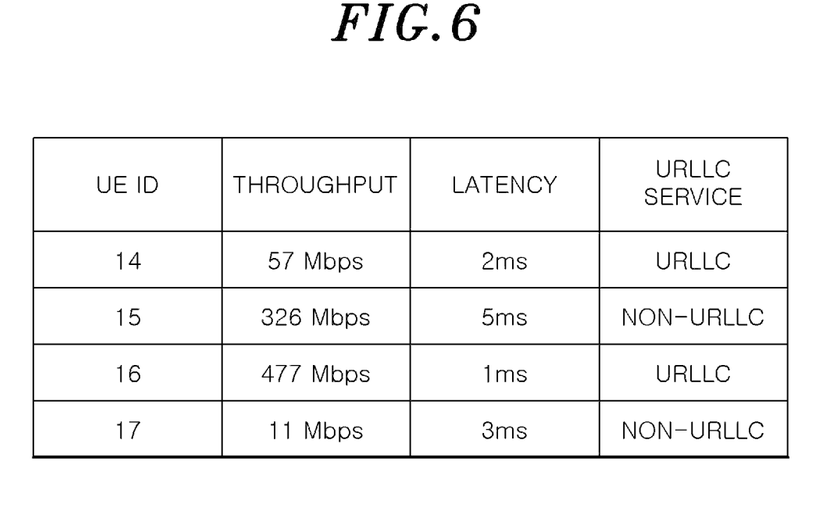
FIG. 6 shows a table illustrating resource status information of a target base station that an UPF obtained from the target base station.

According to the first method among these, in a step D, the SMF 100 transmits a request for resource status information of the T-RAN 300B to the UPF 200 through the N4 interface. Thereafter, in a step E, the UPF 200 obtains the resource status information of the T-RAN 300B by monitoring the N3 interface between the UPF 200 and the T-RAN 300B. FIG. 6 shows a table illustrating the resource status information of the T-RAN 300B obtained by monitoring the N3 interface between the UPF 200 and the T-RAN 300B. Referring to FIG. 6, IDs of UEs accessing the T-RAN 300B, throughput and latency of each UE, and information on whether the URLLC service is provided to each UE may be included in the resource status information.

Referring back to FIG. 3, in a step G, the UPF 200 provides the resource status information of the T-RAN 300B obtained in the step E to the SMF 100 through the N4 interface. Thereafter, the SMF 100 compares the resource information of the S-RAN 300A used by the UE 500A with the resource status information of the T-RAN 300B.

According to the result of the comparison, a sufficient resource may be secured in the T-RAN 300B. In this case, in a step H, the SMF 100 transmits, to the UPF 200 through the N4 interface, a request that the T-RAN 300B maintains such a state (a state in which the resource is sufficiently secured).

Then, the UPF 200 performs operations related to, for example, a PDR, a FAR, a QER, etc. so that the T-RAN 300B maintains such the state. As a result of performing the operations, access of a new UE may be limited in the T-RAN 300B thereafter, or there may be rate limiting even if the access is allowed.

However, according to the result of the comparison, a sufficient resource may not be secured in the T-RAN 300B. In this case, the SMF 100 determines an action to be transmitted to the UPF 200 in order to secure the resource, for example, an action related to control over the PDR, the FAR, the QER, etc. An example of the action may include an action to withdraw or reduce a part of the resource allocated to the existing the UEs 500B and 500C already connected to the T-RAN 300B, or an action to transmit a request for handover for some of the existing UEs 500B and 500C to another RAN other than the T-RAN 300B. Herein, the existing UE for which a part of the resource is withdrawn or that is a target for the handover to another RAN may be a UE not provided with the URLLC service (referred to as a non-URLLC UE 500C). At this time, whether each of the existing UE 500B and 500C is provided with the URLLC service may be identified through the information shown in FIG. 6, that is, the information that the SMF 100 received from the UPF 200 in the step G.

The determined action is transmitted from the SMF 100 to the UPF 200, and the UPF 200 performs a predetermined operation based on the received action so that the resource may be secured in the T-RAN 300B. In addition, as the resource is secured in the T-RAN 300B, a resource for supporting the URLLC service may be provided for other interfaces connected to the UPF 200, for example, the N6 interface or the N9 interface.

Next, according to the second method, in the step D, the SMF 100 transmits a request for securing the resource in the T-RAN 300B to the UPF 200 through the N4 interface. While transmitting the request, the SMF 100 further transmits, to the UPF 200, the resource information of the S-RAN 300A used by the UE 500A while receiving the URLLC service. Then, in the step E, the UPF 200 obtains the resource status information of the T-RAN 300B by monitoring the N3 interface between the UPF 200 and the T-RAN 300B. Herein the obtained resource status information is as shown in FIG. 6.

Referring back to FIG. 3, the UPF 200 compares the resource information of the S-RAN 300A used by the UE 500A with the resource status information of the T-RAN 300B.

As the result of the comparison, a sufficient resource may be secured in the T-RAN 300B. In this case, the UPF 200 performs operations related to, for example, the PDR, the FAR, and the QER so that the T-RAN 300B maintains such the state (the state in which the resource is sufficiently secured). Accordingly, access of a new UE may be limited in the T-RAN 300B thereafter and there may be rate limiting.

However, as the result of the comparison, a sufficient resource may not be secured in the T-RAN 300B. In this case, the UPF 200 determines a predetermined action for securing the resource (for example, the action related to control over the PDR, the FAR, the QER, etc.) and then performs a predetermined operation based on the determined action so that the resource may be secured in the T-RAN 300B. An example of the action for this method is the same as the first method. In addition, as the resource is provided in the T-RAN 300B, a resource for supporting the URLLC service may be provided for other interfaces connected to the UPF 200, for example, the N6 interface or the N9 interface.

According to the above-described two methods, the resource information of the S-RAN 300A used by the UE 500A while receiving the URLLC service is compared with the resource status information of the T-RAN 300B. At this time, the resource information of the S-RAN 300A to be compared may be resource information measured during a predetermined period prior to the time of the handover request (that the SMF 100 was received from the AMF 400 in the step C), and any one of a maximum value, a minimum value, or an average value of the resource information measured during the predetermined period may be a reference of the resource to be secured in the T-RAN 300B.

Herein, whether the resource information is measured during the predetermined period prior to the time of the handover request may be identified based on the 'measurement time' for each resource information shown in FIG. 4.

In addition, in the step C, information on the estimated time for performing the handover may be transmitted to the SMF 100. The UPF 200 may control the T-RAN 300B so that a process of securing the predetermined resource in the T-RAN 300B may be performed within the estimated time for performing the handover.

Herein, each of the steps B, C, D, G and H is performed on a Control Plane.

As described above, according to an embodiment, when the handover for a UE receiving the URLLC service by accessing the S-RAN 300A is performed to the T-RAN 300B, the resource in the S-RAN 300A used to provide the URLLC service may be secured in the T-RAN 300B at the time or before the handover for the UE is completed. Accordingly, even immediately after the handover, the URLLC service may be seamlessly provided to the UE, and a delay may not occur in terms of performance or a rate when the URLLC service is provided. In other words, a URLLC service having the same quality as the URLLC service provided to the UE before the handover is performed may be provided even after the handover. In addition, as the resource is provided in the T-RAN 300B, the resource for supporting the URLLC service may be provided for other interfaces connected to the UPF, such as the N6 interface or the N9 interface.

On the other hand, the disclosure related to the above-described handover management method may be implemented in a form of a computer-readable storage medium storing a computer program programmed to perform each step included in the handover management method or the computer program, stored in the computer-readable storage medium, programmed to perform each step included in the handover management method.

According to an embodiment, a URLLC service having the same quality as the URLLC service provided to the UE before the handover is performed may be provided even after the handover.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A handover management method performed by a session management function (SMF), the method comprising:

receiving handover information related to a user equipment (UE) receiving a predetermined service by accessing a source radio access network (S-RAN);

obtaining, after receiving the handover information, resource information on a resource used when the predetermined service is provided to the UE at the S-RAN; and transmitting, to a user plane function (UPF), before performing handover from the S-RAN to a target radio access network (T-RAN), a request that a resource corresponding to the obtained resource information be secured in the T-RAN.

2. The method of claim 1, wherein the received handover information includes time information on a time at which handover is requested, and wherein the resource information used at the S-RAN is obtained during a period prior, by a predetermined time, to the time at which the handover is requested.

3. The method of claim 1, wherein the obtained resource information includes at least one of throughput, latency, and a bandwidth between the S-RAN and the UE measured when the predetermined service is provided to the UE.

4. The method of claim 1, wherein the receiving the handover information is receiving at least one of types of the resource to be secured in the T-RAN, and estimated time information on handover for the UE.

5. The method of claim 1, further comprising:

receiving resource status information of the T-RAN from the UPF after receiving the handover information, and wherein the transmitting the request to the UPF includes:

comparing the obtained resource information with the received resource status information of the T-RAN;

drawing, based on a result of the comparison, action to secure a resource corresponding to the obtained resource information in the T-RAN; and transmitting, to the UPF, a request for operation of the drawn action.

6. The method of claim 5, wherein the resource status information of the T-RAN received from the UPF includes at least one of throughput, latency, and a bandwidth between the T-RAN and a UE accessing the T-RAN, and information on whether an ultra-reliable and low latency communications (URLLC) service is being provided to the UE accessing the T-RAN.

7. The method of claim 1, wherein the transmitting the request to the UPF is transmitting, to the UPF, a request that when handover for the UE to the T-RAN is performed, a resource corresponding to resource information having a maximum value among the obtained resource information is to be secured in the T-RAN.

8. The method of claim 1, wherein the transmitting the request to the UPF is transmitting, to the UPF, at least one of a request for reducing a resource of the T-RAN allocated to a part of UEs accessing the T-RAN, a request for handover for the part of the UEs to another radio access network other than the T-RAN, and a request for limit on additional access of a UE to the T-RAN.

9. A non-transitory computer-readable storage medium including computer executable instructions, wherein the instructions, when executed by a processor, cause the processor to perform a handover management method, the method comprising:

receiving handover information related to a user equipment (UE) receiving a predetermined service by accessing a source radio access network (S-RAN);

obtaining, after receiving the handover information, resource information on a resource used when the predetermined service is provided to the UE at the S-RAN; and transmitting, to a user plane function (UPF), before performing handover from the S-RAN to a target radio access network (T-RAN), a request that a resource corresponding to the obtained resource information is to be secured in the T-RAN.

10. The non-transitory computer-readable storage medium of claim 9, wherein the received handover information includes time information on a time at which handover is requested, and wherein the resource information used at the S-RAN is obtained during a period prior, by a predetermined time, to the time at which the handover is requested.

11. The non-transitory computer-readable storage medium of claim 9, wherein the obtained resource information includes at least one of throughput, latency, and a bandwidth between the S-RAN and the UE measured when the predetermined service is provided to the UE.

12. The non-transitory computer-readable storage medium of claim 9, wherein the receiving the handover information is receiving at least one of types of the resource to be secured in the T-RAN, and estimated time information on handover for the UE.

13. The non-transitory computer-readable storage medium of claim 9, further comprising:

receiving resource status information of the T-RAN from the UPF after receiving the handover information, and wherein the transmitting the request to the UPF includes:

comparing the obtained resource information with the received resource status information of the T-RAN;

drawing, based on a result of the comparison, action to secure a resource corresponding to the obtained resource information in the T-RAN; and transmitting, to the UPF, a request for operation of the drawn action.

14. The non-transitory computer-readable storage medium of claim 13, wherein the resource status information of the T-RAN received from the UPF includes at least one of throughput, latency, and a bandwidth between the T-RAN and a UE accessing the T-RAN, and information on whether an ultra-reliable and low latency communications (URLLC) service is being provided to the UE accessing the T-RAN.

15. The non-transitory computer-readable storage medium of claim 9, wherein the transmitting the request to the UPF is transmitting, to the UPF, a request that when handover for the UE to the T-RAN is performed, a resource corresponding to resource information having a maximum value among the obtained resource information is to be secured in the T-RAN.

16. The non-transitory computer-readable storage medium of claim 9, wherein the transmitting the request to the UPF is transmitting, to the UPF, at least one of a request for reducing a resource of the T-RAN allocated to a part of UEs accessing the T-RAN, a request for handover for the part of the UEs to another radio access network other than the T-RAN, and a request for limit on additional access of a UE to the T-RAN.

* * * * *